July 6, 1965
R. W. SCHEYHING ETAL
3,193,768
PLURAL-CHANNEL PULSE GENERATOR WITH FEEDBACK
CONTROLLING DURATION OF OUTPUT PULSES
FROM SAID CHANNELS
Filed Jan. 30, 1962
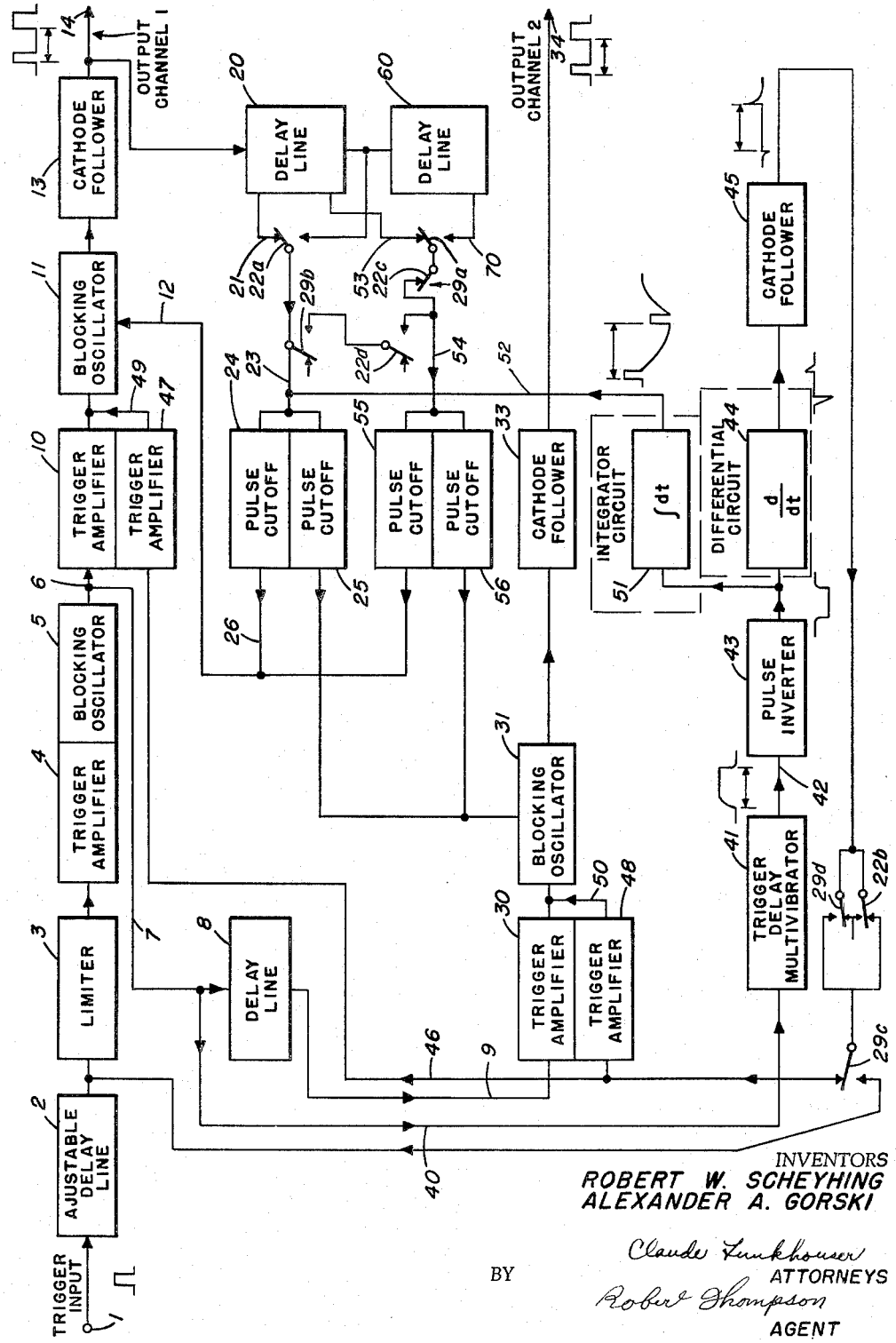
INVENTORS
ROBERT W. SCHEYHING
ALEXANDER A. GORSKI
BY
Claude Funkhouser
ATTORNEYS
Robert Thompson
AGENT 3,193,768
PLURAL-CHANNEL PULSE GENERATOR WITH FEEDBACK CONTROLLING DURATION OF OUTPUT PULSES FROM SAID CHANNELS
Robert W. Scheyhing, Moorestown, and Alexander A. Gorski, Riverton, N.J., assignors, by mesne assignments, to the United States of America as represented by the Secretary of the Navy
Filed Jan. 30, 1962, Ser. No. 169,985
3 Claims. (Cl. 328—62)

This invention relates to pulse generators, and more particularly to an improvement in pulse generators of the type that generate two series of pulses over separate channels from a single pulse source.

It is frequently desirable in electronic circuits involving generation of complex wave forms to provide a means for accurately forming and determining the duration and frequency of pulse wave forms which comprise a series of pulses to be used on timed circuits. For example it is sometimes desirable in specialized radar systems to sensitize the receiving section of the radar only during predetermined periods following the initial transmission of a radar pulse to permit a selective display of radar position information only in relation to certain anticipated ranges and positions within predetermined areas with relation to the transmission point. For this reason it may be desirable for the transmitted radar pulses to inaugurate a chain or series of control pulses which are not always of the same duration or the same phase relationship as the initiating pulse. By using a pulse generator which is capable of forming pulses of different duration, the radar circuit is able to activate certain portions of the radar system during specific time intervals. This selective activation of the radar circuits prevents error signals due to reflected waves, false signals, noise, and other causes.

Furthermore, it is sometimes desirable in the interest of economy to operate two sections of equipment from the same pulse source. If these two sections of the equipment are operated off the same line there is the strong possibility of error signals being impressed upon one section due to the switching action or operation of the other section. This is especially prevalent where one section is switched in before the other section and the slight time delay causes a transient or reflected error signal to be sent to the other circuit in turn causing either a premature operation or a operation over an extended time period making the circuit more susceptible to the indication of erroneous signals.

This invention is not particularly limited to radar but can be used in other electronic arts and circuitry, such as communications, where accurate timing of pulses and pulse delay is desired. This would be especially true in television and in some cases in microwave switching circuits for telephone communications. One of the common ways of generating chains or groups of signal pulses is to connect in cascade relationship a plurality of multivibrator circuits of the monostable type. Under such conditions triggering of the first multivibrator would set off a chain reaction in which each multivibrator is successively triggered by the preceding multivibrator. If accurate multivibrators are obtained and used the timing of the pulses will be accurate if a source of timing pulse signals are provided. But due to the complexity and the effects of heating on these multivibrator circuits, they are not always the best and most reliable circuit to use under all conditions. Furthermore, there is the shortcoming of not being able to vary the pulse duration or phase relationship with any degree of accuracy, which would be desirable.

Therefore it is an object of this invention to provide an accurate simplified pulse generator which converts a single trigger pulse into a two channel output with accurately spaced pulses of different time duration.

Another object of this invention is to provide an adjustable pulse generator which converts a single pulse into a two channel output of accurately and adjustably spaced pulses of different time duration.

It is another object of this invention to provide a pulse generator which converts a trigger pulse into a pulse string of accurately spaced pulses of varying time duration.

Another object of this invention is to provide a means for generating a series of pulses from a single input pulse.

Another object of this invention is to provide a means for providing a series of output pulses on multiple channels from a single input pulse.

Another object of this invention is to provide a means for generating a series of output pulses on multiple channels from a single input pulse without the aid of a pulse timing means.

Various other objects and advantages will appear from the following description of one embodiment of the invention, and the novel features will be particularly pointed out hereinafter in connection with the appended claims.

In the illustrated embodiment of the invention a single trigger pulse is impressed on the input terminal 1 of the circuit. This pulse is sent through the adjustable delay line 2 which can be adjusted for any time delay to compensate for delays inherent in the pulse generator circuit elements which follow. This delay line 2 can be one of any of the commonly known and used delay lines from the radar or pulse circuit art. Since the invention lies in the arrangement of the circuit elements and is not particularly limited to any particular circuit element, no limitations should be placed on the individual elements.

A limiter 3 is included in series circuit relationship with the adjustable delay line 2 and remove the extremities of the delayed input wave in such a manner that the rounded top is clipped off and the peak of the pulse is flat or squared off. By using such a circuit the peaks of the waves are kept at a constant amplitude and shape. Also, the limiter 3 acts as a protective device which prevents the input pulse voltages from swinging too far in the positive or negative direction.

Since it is desirable to have a trigger pulse with a very sharp or fast rising leading edge, a trigger amplifier 4 is used. Because the delay line 2 tends to distort the input trigger pulse from a sharply defined pulse to a rounded and attenuated pulse with a sloping leading and trailing edge and since the limiter 3 is only effective in clipping the top of this attenuated pulse the trigger amplifier 4 serves to convert this delayed pulse into an amplified and sharply defined pulse signal.

Closely associated with the trigger amplifier is a blocking oscillator 5 which will tend to cut off after an accumulation of negative charges on a grid capacitor normally associated with such oscillating circuits. The pulse from the blocking oscillator 5 will then divide on two parallel circuit channel arrangements immediately following it. Part of the pulse signal from blocking oscillator 5 will branch onto channel 1 over the lead 6, while channel 2 will receive a pulse over the line formed by lead 7, delay line 8 and lead 9. These pulses will then activate each of the two channels in the manner to be explained shortly.

Another trigger amplifier 10 is operated on by the pulse from the blocking oscillator 5 and performs the same function as the trigger amplifier 4. This trigger amplifier 10 shapes the wave and applies it to a second blocking oscillator 11 which is of a different form that the first blocking oscillator 5. This second blocking oscillator has a control lead 12 associated with it and operates such that when a signal is impressed on the control lead 12, the oscillator 11 will cut off.

The output signal from this blocking oscillator 11 operates a cathode follower 13 which is an isolation circuit which has a high current gain but a voltage gain of less than unity along with low distortion. This cathode follower 13 has a high input impedance for matching with the blocking oscillator 11. The output impedance of the cathode follower 13 is low compared to the input impedance and due to this feature there is a better matching of the preceding circuit to the feedback circuitry which follows it. Also there is excellent isolation of the output circuit from the pulse generated circuit. The output pulse from this cathode follower 13 will closely approximate that of the blocking oscillator 11 since there is very low distortion. This output pulse on lead 14 can be of any duration which is predetermined by the switching frequency of the blocking oscillator 11 and the feedback circuits which control it.

The feedback circuit operates as follows. The output pulse is sent through the delay line 20 through the lead 21, the switching contact 22a, then through the line 23 leading to the pulse cut off amplifiers 24 and 25. The switch contacts 22a through 22d are associated with relay coil 22 (not shown). Similarly, contacts 29a through 29d are associated with relay coil 29 (not shown). The relay contacts are shown in the figure in the deenergized position. Their operation will be further described below. For the moment we are only concerned with the cut off amplifier 24. This cut off amplifier 24 operates on the leading edge of the delayed output pulse and converts it to a signal which is then sent from the output 26 of the cut off amplifier 24 to the cut off terminal 12 of the blocking oscillator 11. The blocking oscillator 11 is then cut off and the signal to the cathode follower 13 is therefore cut off. This cut off forms the trailing edge of the output pulse which is then cut off and no more signal is sent through the delay line. In this manner it can be seen that the delay line controls the time duration of the output pulse.

The circuit elements of output channel 2 are similar in arrangement and operation to the circuit elements of the output channel 1. The only difference in the two circuit branches is the delay line 8 added in the line leading to output channel 2. This delay line delays the signal from the blocking oscillator 5 to the trigger amplifier 30. As can be seen from the drawing, the delay line 8 is connected to the output of the blocking oscillator 5 by the lead 7 and to the trigger amplifier 30 by the lead 9. This delay line 8 can be preset for any predetermined delay time depending on what delay characteristics are desired in the pulses on the output channel 2. This delayed pulse from the delay line 8 operates on the trigger amplifier 30 which forms an amplified pulse. The amplified pulse operates the blocking oscillator 31, the output pulse from which is impressed on the cathode follower 33 and the pulse signal from this cathode follower is sent directly to the output terminal 34. In the case of channel 2, the output pulse is not fed back to cut off the pulse since the pulse duration is controlled by the feedback circuit of channel 1 acting on the pulse cut off amplifier 25 and in turn on the blocking oscillator 31. As has been noted the output pulse does not operate on the delay line 20, therefore the delayed time of the delay line 8 is of very short duration; approximately on the order of a fraction of a microsecond. If this were not so, the signal from the delay line 20 would operate on the cut off amplifier 25 and cut off the blocking oscillator 31 before the pulse from the trigger amplifier 30 had completed operation on the blocking oscillator 31 and a pulse of shorter duration would be formed on channel 2 than channel 1. Of course if a pulse of shorter duration is needed on channel 2 than on channel 1 the time delay of the delay line 8 can be increased accordingly.

The pulse from the first blocking oscillator 5 to the input of channel 2 is sent to a trigger delay multivibrator 41 over the lead 40 before the pulse reaches the delay line 8. This delay trigger 41 is a monostable multivibrator which is actuated by the trailing edge of the pulse from blocking oscillator 5. The timing of this multivibrator 41 is adjusted so that a 30 microsecond pulse is delivered at the output lead 42. This 30 microsecond pulse wave is then sent to the pulse inverter 43 which functions to shape and invert the pulse. The pulse is then differentiated by the differentiator 44 to get a negative pulse at the leading edge and a positive pulse at the trailing edge. These differentiated pulse spikes then operate on a cathode follower 45 which amplifies the positive portion of the pulse only since the bias of the cathode follower is set so as not to produce a negative signal. This amplified positive pulse is then sent through the contacts 22b and 29c, over the lead 46 to the trigger amplifier 47 and trigger amplifier 48.

Trigger amplifier 47 and trigger amplifier 48 then give a trigger pulse signal to the input of the blocking oscillators 11 and 31 over the lead 49 and 50. Blocking oscillator 11 and blocking oscillator 31 again start a pulse signal which is sent through the cathode followers 13 and 33 respectively on output channels 1 and 2. The leading edge of the pulse on output channel 1 is fed back through the delay line 20 in the same manner as discussed for the preceding pulse.

It shall be now noted that the output from the pulse inverter 43 is also sent to the input of an integrating circuit 51. This integrating circuit will integrate the pulse and the integrated ramp voltage formed by it will be sent to the lead 52 and bias the cut off amplifiers 24 and 25 far below the cut off values. With the cut off amplifiers 24 and 25 far below the cut off value, the leading edge of the second pulse on output channel 1 will not be of sufficient signal strength to operate the cut off amplifiers when it is tapped at lead 21. In turn a signal will not be sent to the blocking oscillators 11 and 31 which can cut them off.

The pulse continues down the delay line 20 until it reaches the second tap 53. This tap 53 then sends the pulse signal through the second set of contacts 29a, 22c and lead 54 to cut off amplifiers 55 and 56. Since cut off amplifiers 55 and 56 are not biased beyond the cut off value the delayed signal will operate them and send a cut off pulse to blocking oscillators 11 and 31. Blocking oscillators 11 and 31 are then shut off as previously discussed. Since it take a longer length of time for the pulse to travel to the second tap 53 of delay line 20, it can be seen that the second pulse is of a longer time duration than the first pulse. The trailing edge of this longer pulse is then sent through cathode follower 13 on chanel 1 and cathode follower 33 on output channel 2.

If it is preferred to send the differentiated position pulse spike from cathode follower 45 through the limiter 3 instead of directly to the trigger amplifiers 47 and 48, the relay 29 can be energized thus closing contact switch 29c and the pulse spike signal is then clipped by the limiter 3 so that the pulse will not be of too high an amplitude as explained previously. The trigger amplifier 4 then increases the time rise of the leading edge of the pulse and operates on the blocking oscillator 5 which again forms another pulse. This pulse acts on the trigger amplifier 10 and the trigger amplifier 30 as previously discussed. The trigger amplifier signal is then sent to the blocking oscillators 11 and 31 which places these oscillators in the "on" condition. The leading edge of the oscillators' pulses is then sent through the cathode follower 13 on channel 1 and the cathode follower 33 on channel 2. As before the leading edge of the output pulse is sent through the delay line 20. Since the signal from the integrator 51 has still biased the cut off amplifiers 24 and 25 beyond the point where it can generate a cut off signal, the signal from tap 1 will not affect them. The leading edge of the pulse signal will follow down delay line 20 and into delay line 60 since the contact 29a of the second tap is now in the lower position because of energization of relay coil 29, not shown. The pulse follows down the delay line 60 and out the tap 70, through the contacts 29a and 22c over the lead 54 and to cut off amplifiers 55 and 56. The signals from the cut off amplifiers then cut off the blocking oscillator 11 on channel 1 and the blocking oscillator 31 on channel 2. When the blocking oscillators are cut off this produces the trailing edge of the output pulse. This trailing edge of the output pulse is then sent through cathode follower 13 and cathode follower 33. The trailing edge of this lengthened output pulse is then sent out through the output terminal 14. The lengthened pulse on output channel 2 is sent out through the output terminal 34. Energization of relay 29 has no further effect on the circuitry since in the case of contacts 29b, 22d remains open and closure of contacts 29d causes no new path since 22b in the position shown establishes this path.

There is no worry about the pulse which is sent through the limiter 3, through the trigger amplifier 4 and blocking oscillator 5 being sent over the lines 7 and 40 and triggering the trigger delay multivibrator 41 again, since this delay multivibrator 41 has a slow recovery time, switching not being possible unitl recovery is achieved.

It can be seen that the contact sets 22 or 29 can be used to vary the length of the pulses which are sent out over the output channel. Further, if relay 22 alone is energized, a single pulse will be generated on each channel since the feedback path from cathode follower 45 is broken, due to the fact that contact switch sets 29d and 22b are both open. It can also be seen that by adjusting the timing of the delay multivibrator 41, the spacing between the pulses can be varied with a high degree of accuracy. Since only one pulse is needed to operate the pulse string it should be readily apparent there is no need for a clack source or synchronizing means which would have to be kept in adjustment. The circuit is ready for instant operation at any moment and does not depend on an input pulse being synchronized with a clock generator. In this manner a random pulse or unexpected pulse can be received and can be converted into a pulse series which will operate the circuit which follows on the output channel 1 or 2.

It will be understood that various changes in the details, materials, depth and arrangement of parts which have been herein described and illustrated in order to explain the nature of the invention may be made by those skilled in the art within the principle and scope of the invention as expressed in the appended claims.

What is claimed is:

1. A pulse generator including:
    a pulse shaping means having an input terminal, said pulse shaping means receiving an input pulse and providing an output pulse;
    first and second ouput channels, each of said channels having an input, output, and control lead;
    means for receiving said output pulse on the input lead of both of said channels;
    feedback means connected between the output lead of one of said channels and to the control leads of each of said output channels for controlling the duration of said output pulse; and
    further pulse shaping means operatively coupled to the output of said first-mentioned pulse shaping means and operatively coupled to the control lead of at least one of said channels for further controlling the duration of said output pulse.

2. The device of claim 1 wherein the pulses from said channels are of different duration.

3. The device of claim 2 further including:
    switching means connecting said further pulse shaping means to either both of said first and second output channel input leads, or the input terminal of said first-mentioned pulse shaping means whereby said pulses are recirculated in said channels.

References Cited by the Examiner

UNITED STATES PATENTS

| 2,499,534 | 3/50 | Sorber | 328—105 |
| 2,638,572 | 5/53 | Goubau | 328—34 |
| 2,922,879 | 1/60 | Vogt et al. | 328—58 |
| 2,943,299 | 6/60 | Dunn | 328—153 X |
| 3,002,152 | 9/61 | Yeaton et al. | 328—62 |

OTHER REFERENCES

Electronics—November 1945 (pages 108–109).

ARTHUR GAUSS, *Primary Examiner.*

GEORGE N. WESTBY, *Examiner.*